Figure 1:
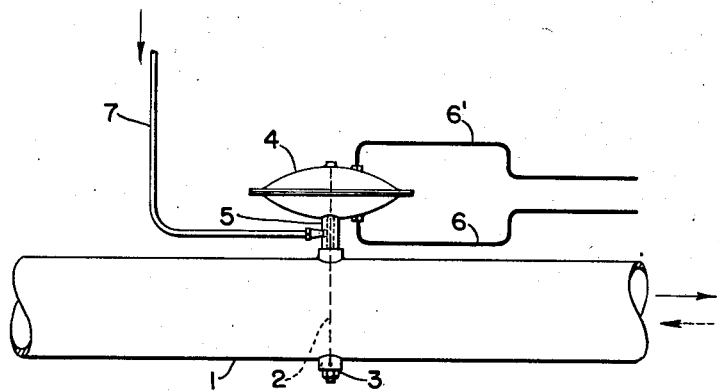

Aug. 4, 1953

E. R. FENSKE 2,647,403

FLOW MEASURING APPARATUS

Filed May 29, 1950

INVENTOR.
ELLSWORTH R. FENSKE
BY
ATTORNEYS.

Patented Aug. 4, 1953

2,647,403

UNITED STATES PATENT OFFICE 2,647,403

FLOW MEASURING APPARATUS

Ellsworth Richard Fenske, Lyons, Ill., assignor to Universal Oil Products Company, Chicago, Ill., a corporation of Delaware Application May 29, 1950, Serial No. 164,963

2 Claims. (Cl. 73—228)

This application relates to means for determining the character of a fluidized particle stream, and more particularly to means for measuring mass flow of a fluidized stream of subdivided particles, by measuring the relative tension or elastic deformation of a wire maintained across a conduit which accomodates the flow of the suspended particle stream.

In various processing operations, such as in connection with fluid catalytic conversion processes, it is advantageous to know whether or not the means mass velocity or mass flow in a particular portion of the unit is substantially uniform, or alternatively, to be able to detect variations in the flow rate of the fluidized particle stream, as they occur. The present invention provides a direct method for indicating and measuring variations in the mass flow of a suspended particle stream, and is of advantage over many types of present flow measuring methods or devices, in that the latter are not adapted for use in streams having finely divided particles entrained therein to the extent that there is a relatively high particle density. Also, certain of the various present types of devices are not readily useable in large diameter lines and conduits such as are in use in the large fluidized catalyst cracking plants.

It is a principal object of the present invention to provide a relatively simple device for indicating and measuring mass flow of a fluidized or suspended particle stream, with the flow rate being a function of elastic deformation of a wire, or other elastic wire-like member, maintained across the fluidized stream.

It is a further object of the invention to provide means for readily positioning or stretching one or more wires across a conduit and connecting therewith extensometer means for obtaining a measure of the tension or elastic deformation therein, and in turn effect the desired measurement of mass flow through the conduit accommodating the fluidized particle stream.

It is a still further object of the invention to provide means for holding and positioning an elastic wire-like member diametrically across a fluid conduit, with means connecting to one end of the wire in the form of a deflectable bellows or diaphragm to which extensometer means may in turn be attached and provide the desired measurement of fluidized flow within the confined conduit.

Briefly, the present invention provides an improved device for measuring the flow of a fluidized particle stream passing through confined conduit means, which comprises, a wire stretched across said stream in said conduit means and means for measuring the resulting elastic deformation in said wire, whereby to thus provide a measure of flow rate within said flow channel.

One or more wires may be positioned or stretched across the channel or conduit which accommodates the fluidized particle stream so that the force created by the mass of moving particles within the fluidized stream results in the stretching and deformation of the wires and mass flow or mass velocity may be measured as the function of the elastic deformation in the stretched wire or wires as the case may be. The elastic deformation of a wire may be measured by extensometer means in various ways as will hereinafter be described more fully.

Normally a single wire or wire-like member may be positioned across a flow channel or conduit accommodating the fluidized stream and when placed across the center line of the conduit will provide a relatively accurate measurement of the mass flow of the fluidized stream. The wire must have elastic properties and be sufficiently flexible to readily deflect in the presence of the particular fluidized particle stream which is to be measured. Preferably, steel or alloy metal wire or small bar sizes are used for stretching across the flow conduit. A simple embodiment of one type of measuring device provides removable plugs or other means connecting to the wall of the conduit in a manner to position the deflectable wire diametrically across the conduit, with the wire having one end held rigidly and the other end connecting to the central portion of a deflectable diaphragm-like member, with the diaphragm member positioned externally of the conduit in a manner permitting the attachment of a micrometer or extensometer means suitable for measuring deflection in the diaphragm and the connecting wire, and thereby indicating and measuring the flow of the fluidized particle stream.

The deflectable diaphragm and the plug-like members which accommodate the stretched wire across the diameter of the conduit, must of course, have suitable holes or passageway means therethrough to permit deflection of the wire within the interior of the conduit member resulting from the mass flow of the fluidized particle stream therein. A preferred embodiment of the measuring device also provides means for bleeding a gaseous stream into a passageway accommodating the stretched wire in order that subdivided solid particles do not flow from the conduit into the wire passageway or into the deflectable bellows or diaphragm positioned externally of the conduit and accommodating the movable end of the wire.

Reference to the accompanying drawing and the following description thereof will serve to further clarify the present improved means for measuring the flow rate of a fluidized particle stream, as well as show in a simplified diagrammatic manner, one method for constructing a flow measuring device.

Figure 1 of the drawing indicates a wire stretched across a relatively large sized conduit and connecting with a deflectable diaphragm whereby tension or elastic deformation may be measured in the stretched wire for a flow rate determination.

Figure 2:
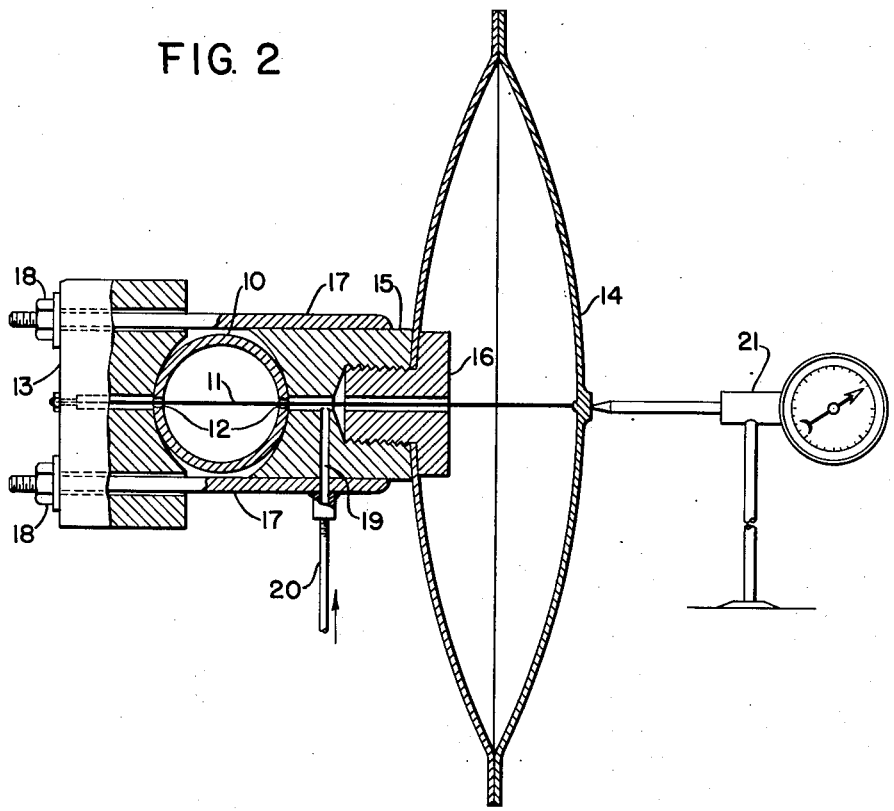

Figure 2 of the drawing is a sectional elevation view of apparatus means having a wire stretched across a relatively small conduit and accompanying deflection and extensometer means for measuring changes in the deformation of the stretched wire whereby to measure changes in the flow rate of the fluidized stream passing within the confined conduit.

Referring now to Figure 1 of the drawing, there is shown a conduit 1 having a wire 2 stretched thereacross, with one end of the wire 2 being held by a removable plug 3 and the other end attached to the side of a deflectable diaphragm 4. The diaphragm member 4 is connected to the conduit 1 by suitable supporting and connecting plug 5, which in turn has a passageway therethrough suitable to accommodate the wire 2. The diaphragm member 4 is also of a deflectable nature suitable to move in accordance with deflection or deformation of the wire 2 as the latter is subjected to the impact or force of the fluidized particle stream passing through conduit 1.

Any bellows-like member, or other deflectable type of diaphragm, may be used exteriorly of the conduit and connecting to the stretched wire 2, in order to provide means for measuring tension or deformation in the stretched wire. The arrangement indicated is merely one means of permitting extensometer means to in turn measure the deformation taking place within the stretched wire and thus provide a measure or indication of changes in flow rate of a fluidized stream in the conduit 1.

The improved measuring device of this invention embodies a wire stretched across the confined fluid channel of a fluidized stream, and means for measuring the resulting elastic deformations in the wire to provide a measure of the flow rate within the conduit. However, it is not intended to limit the invention to the use of any particular type of extensometer or strain gauge or the like, for measuring this deformation.

The present drawing indicates diagrammatically arms 6 and 6' in contact with the faces of the deflectable diaphragm 4, in a manner to note changes in the latter and movement in the stretched wire 2, by means of one type or another of extensometer which is not indicated in the drawing.

A bleed line 7 is shown connecting with the connector member 5, in order that an inert fluid or gaseous medium may be bled into the channel or passageway within the plug member 5 and into the conduit 1 so that finely divided particles of the fluidized stream of particles will not be permitted to pass into the interior of the diaphragm or bellows member 4.

Referring now to Figure 2 of the drawing, there is shown a conduit 10 in sectional view, with a wire 11 stretched diametrically across the center of the conduit 10, whereby it may be subjected to the force exerted by the mass flow of the fluidized particle stream passing in the confined conduit 10. In this embodiment, the conduit has small openings or holes 12 permitting the wire 11 to pass therethrough and connect with respectively, a wire holding and clamp member 13 at one end, and the interior face of a suitable deflecting diaphragm 14, at the other end. The diaphragm member 14 is held in place and against the conduit 10 by means of suitable coupling member 15 and shoulder bolt 16, each of which have suitable hole or passageway means to accommodate the stretched wire 11. The clamping block 13 also has openings to accommodate bolt-like members or leg 17 from the connecting block 15 so that nuts 18 may clamp the wire holding and supporting members tightly to the conduit 10.

The connecting block 15 also has a fluid inlet port 19 connecting with the wire passageway so that a bleed line 20, accommodating a suitable inert gaseous medium, may be introduced into the passageway under pressure that will prevent subdivided particles from passing out of the confined conduit 10 into the bellows or deflectable diaphragm 14.

The present embodiment indicates diagrammatically a screw-type micrometer 21, having a clock work dial gauge, as being mounted in a position to contact the exterior face of the diaphragm 14 and thus provide a measure of the deformation of the stretched wire 11 and a resulting measure of the mass flow of the fluidized stream within the confined conduit 10. The extensometer means must, in each installation, be calibrated to measure flow for the particular size conduit and type of fluidized particle stream which is accommodated in the conduit.

It may also be mentioned in connection with the embodiment of Figure 2, that it is not intended to limit the measure of the deformation of the stretched wire to this type of extensometer, or to any particular type of deformation measuring apparatus, for any one of the well known mechanical or electrical types of extensometer means may well be used. Also, with respect to the improved means of measurement of mass flow of a fluidized stream, it is not intended to limit the measurement of deflection of the one or more stretched wires, that may be placed across a confined channel, to the use of a deflectable diaphragm such as indicated in the accompanying drawing. However, the use of a diaphragm or bellows-like member externally of the flow channel and connecting directly to one end of the wire which stretches across the flow channel, provides means for easily and readily attaching extensometer means, to in turn measure the deformation taking place from the mass flow of the fluidized particle stream. While the drawing also shows only one wire as being stretched across the conduit or confined fluid channel accommodating the fluidized stream, it may again be noted that two or more of the stretched wires may well be used and deformations measured to insure the accurate indications of change in characteristics of the fluidized stream which is being measured.

I claim as my invention:

1. In combination with a closed conduit adapted for the flow of a fluid stream therethrough, a flow measuring device comprising a supporting plug on one side and extending exteriorly of the conduit, said plug having a longitudinal passageway therethrough, wire holding means attached to the opposite side of said conduit, a hollow deflectable cell having one wall thereof connected to said plug externally of the conduit, a wire secured to said holding means and to the central portion and on the inner side of the other wall of said cell and extending diametrically across the conduit and through said passageway into the hollow cell, and extensometer means connected with said other wall of said cell for measuring deflection of the cell and said wire.

2. The flow measuring device of claim 1 further characterized in that said supporting plug is provided with a lateral fluid inlet port communicating with said passageway.

ELLSWORTH RICHARD FENSKE.

References Cited in the file of this patent

UNITED STATES PATENTS

| Number | Name | Date |
|---|---|---|
| 1,352,391 | Starling et al. | Sept. 7, 1920 |
| 2,032,383 | Vroom | Mar. 3, 1936 |

FOREIGN PATENTS

| Number | Country | Date |
|---|---|---|
| 76,568 | Austria | May 26, 1919 |